United States Patent [19]

Song

[11] Patent Number: 5,432,930
[45] Date of Patent: Jul. 11, 1995

[54] SYSTEM FOR ACCESSING COBOL DATA FILES BY GENERATING A DICTIONARY OF $NF^2$ RELATIONS TO BE USED BY A COBOL COMPATIBLE SQL

[75] Inventor: Zhi Y. Song, Chaywan, Hong Kong

[73] Assignee: Eagle Crest Limited, Hong Kong

[21] Appl. No.: 130,861

[22] Filed: Sep. 30, 1993

[51] Int. Cl.⁶ .............................................. G06F 17/30
[52] U.S. Cl. ............................. 395/600; 364/DIG. 1; 364/282.3; 364/282.1; 364/283.4
[58] Field of Search ......................................... 395/600

[56] References Cited

U.S. PATENT DOCUMENTS

| | | | |
|---|---|---|---|
| 4,931,928 | 6/1990 | Greenfeld | 395/600 |
| 5,230,049 | 7/1993 | Chang et al. | 395/700 |
| 5,257,366 | 10/1993 | Adair et al. | 395/600 |
| 5,339,424 | 8/1994 | Fushimi | 395/650 |

*Primary Examiner*—Thomas G. Black
*Assistant Examiner*—Wayne Amsbury
*Attorney, Agent, or Firm*—Ronald M. Anderson

[57] ABSTRACT

A system and method enabling use of a COBOL compatible structured query language (CCSQL) to manipulate data stored in a COBOL data file, which is in a nonfirst normal, hierarchical format. Initially, a dictionary generator subsystem creates a corresponding dictionary for each COBOL data file. In the dictionary, the $NF^2$ hierarchical logical relationship between the items and attributes (hierarchical nature) of each item of a COBOL data file are defined. Thereafter, whenever a new COBOL data file is produced, a corresponding dictionary is generated. When a user enters a request in the CCSQL format to query a COBOL data file, the request is parsed. The definitions in the dictionary are used by the CCSQL kernel to manipulate the data in response to the user's query. A command interpreter processes the request to determine the appropriate data manipulation to apply and initiates a CCSQL kernel request that carries out the intended action, with reference to the corresponding dictionary. For example, the request may require that certain items from a COBOL data file be extracted to produce a report. Because the hierarchical logical relationships between the items in the COBOL data are defined in the corresponding dictionary, a CCSQL report generator subsystem can produce the report using data extracted from the COBOL data file in accordance with criteria provided by the user, but without converting the data in the COBOL data files to a 1NF. COBOL programs with embedded CCSQL commands are preprocessed to convert the CCSQL commands to a COBOL compatible structured language that uses the dictionaries to access data referenced in the COBOL data files.

19 Claims, 15 Drawing Sheets

SYSTEM FOR ACCESSING COBOL DATA FILES BY GENERATING A DICTIONARY OF NF$^2$ RELATIONS TO BE USED BY A COBOL COMPATIBLE SQL

FIELD OF THE INVENTION

This invention generally relates to a system and method for accessing and manipulating data in a database, and more specifically, data developed and stored under the COBOL programming language environment.

BACKGROUND OF THE INVENTION

During the 1970's, IBM Corporation developed a database language called SEQUEL (Structured English QUEry Language) that could be used for retrieving and manipulating data in a relational database. A subset of this language, called SQL (for Structured Query Language) has become an accepted standard for querying, changing, and manipulating data in such databases. Its primary use is in formulating interactive queries and in handling data based on simple programmed instructions. However, SQL is restricted to use with databases that are of First Normal Form (1FN) in which only atomic (i.e., non-decomposable) valued domains are allowed, as discussed by E. Codd in "A relational Mode for Large Shared Data Banks," Communications of the ACM Transactions on Database Systems 13 (6), pp. 377–387 (1970) and by J. Ullman in "Principles of Database Systems," second edition, Computer Science Press (1982). Under conventional techniques, SQL has not been implemented to access data files stored in a file structure that is of a Non-First Normal Form (NF$^2$).

Perhaps the most common NF$^2$ data file structure in the business world is that created using COBOL, an acronym for COmmon Business-Oriented Language. Use of COBOL and the data files produced by it have become particularly prevalent in business because the programming language has a verbose, English-like syntax and because it was required that contractors working with the U.S. Department of Defense standardize on COBOL for data management activities relating to government work. COBOL, which is a procedural programming language that is compiled before execution, is divided into four different parts, including: (1) Identification, (2) Procedures, (3) Environment, and, (4) Data. The Data portion of the language is based on a hierarchical data structure that is of NF$^2$. An understanding of certain aspects of the COBOL data structure is important in order to appreciate why conventional SQL is unable to extract data from a COBOL data file.

A COBOL data file comprises a set of items, each of which has its own description. There are three types of items in COBOL, including elementary, group, and array items. An elementary item is a subdivision of a record that cannot be further subdivided; a group item comprises a named sequence of one or more elementary items or group items; and, an array comprises a table that defines homogeneous sets of repeated data items. The organization of COBOL data files is based on the "level" of the elementary items and group items comprising each data file. As will be even more evident from an example presented below, the data structure employed by COBOL is very different from the data structure of conventional relational databases, which are restricted by the limitations of 1NF. In this sense, SQL cannot directly retrieve data from COBOL data files. However, when a user needs to embed SQL statements in COBOL programs, they have to first normalize the data format to the 1NF, which is substantially different from that of the standard COBOL data files.

It is therefore desirable to enhance the conventional SQL so that it can be used to retrieve and manipulate COBOL data files. More importantly, such an extended SQL should allow an operator to describe and access COBOL data files directly, combining the non-procedural language of SQL with the procedural programming language of COBOL in a natural and seamless fashion. These and other benefits and advantages are provided by the present invention, COBOL Compatible Structured Query Language (CCSQL), which represents a novel development and application of the extended relational algebra and calculus theory presented by M. Roth, H. Korth, and A Silberschatz in "Extended Algebra and Calculus for NF$^2$ Relational Databases," ACM Transactions on Database Systems 13 (4) pp. 389–417 (1988).

SUMMARY OF THE INVENTION

In accordance with the present invention, a method for manipulating data stored in COBOL data files that are normally accessed using a procedural language, so as to allow direct access of the COBOL data files with a SQL begins with the step of creating dictionaries for each of the COBOL data files that are defined in related COBOL source programs. For each COBOL data file, the corresponding dictionary defines a NF$^2$ hierarchical logical relationship between levels of items comprising the COBOL data file and assigns attributes for each item. The method also provides for parsing a request that is input by a user to determine an appropriate subsystem to implement the request and to determine what type of data manipulation is required. In implementing the request that is input, at least an appropriate one of a plurality of predefined data manipulation operations that act on the data is initiated. Data output that is responsive to the request that was input by the user is provided as a report that includes selected items of the data.

If a new COBOL data file is produced, a dictionary for the new file is created. Again, the dictionary for the new COBOL data file is produced by scanning a COBOL source file associated with the new COBOL data file to determine the NF$^2$ hierarchical logical relationship between the levels of the items comprising the new COBOL data file, and assigning attributes to each item.

The step of parsing to determine the appropriate subsystem includes selecting a subsystem from among a group of subsystems. The group includes: a dictionary generator subsystem that defines the NF$^2$ hierarchical logical relationship and attributes for items in a COBOL data file; a data manipulation language subsystem that implements operations to insert, delete, or update items of the database in accordance with the request input by the user; a query process subsystem that derives a resultant table of data items by selecting specific fields from at least one a COBOL data file in accordance with specified criteria that are provided in the request input by the user; a file access subsystem that reads from and writes to COBOL data files; and, a report subsystem that produces the report in response to the request, said report including items of the database selected by the query process subsystem.

The step of implementing the request includes the step of implementing at least one of the data manipulation operations. These operations include: forming a union of data items; forming an intersection of data items; determining a difference between data items; determining a Cartesian product of data items; determining a projection of data items; performing a natural join of data items; performing a nest of data items; and performing an unnest of data items.

A system for manipulating data stored in a COBOL data file format that are normally accessed using a COBOL procedural language, so as to allow direct access of the data with a SQL, employing a $NF^2$ data model, is another aspect of the present invention. The elements of the system generally carry out functions consistent with the steps of the method discussed above.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

Figure 1:
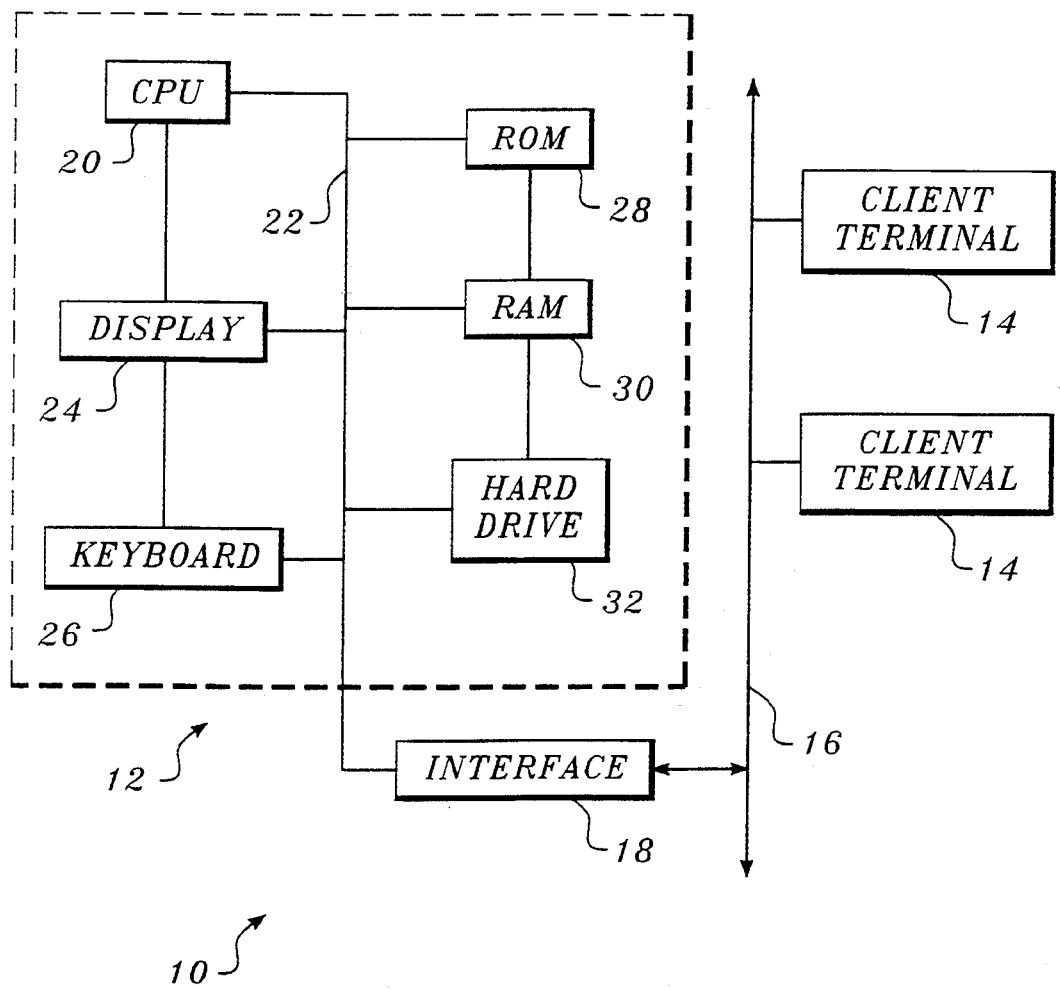
FIG. 1 is a schematic block diagram of a computer network on which the present invention can be used.

In FIG. 1, a portion of a network 10 is illustrated in a schematic block diagram. Network 10 includes a server 12 and a plurality of client terminals 14 that are coupled to the server network by lines 16 through an appropriate interface 18. It will be understood that although only two client terminals are shown, many additional client terminals are connected through lines 16 to server 12. Lines 16 may comprise a twisted pair of conductors, shielded coaxial cable, telephone lines, or other types of hardwired interconnection. Alternatively, a radio or satellite communication linkage (not shown) may also be used to connect the client terminals to server 12. These details are not important in the operation of the present invention; network 10 simply represents the well known client-server paradigm wherein client terminals 14 that are connected to server 12 access and input data by running a software program on the server.

Server 12 comprises a generally conventional computer that includes a CPU 20 connected through a bus 22 to a display 24. Also connected to CPU 20 is a keyboard 26 used for local input of instructions relating to the server's operation and administration. Binary code used to control the boot-up of server 12 and other aspects of its operation is stored in a read-only memory (ROM) 28, which is coupled to CPU 20 through bus 22. In addition, a random access memory (RAM)30 is included in server 12 for temporary storage of software instructions executed during the running of a software application on server 12 and for short-term (volatile) storage of data. A hard drive 32 is included for nonvolatile, long-term storage of executable files and of data files.

It is recognized that the above description of server 12 and network 10 is extremely simplified; however, this explanation is intended simply as a basis for understanding how the present invention runs as executable code on server 12 in response to a user's instructions entered at client terminal 14, in order to access data stored on hard drive 32.

Figure 2A:
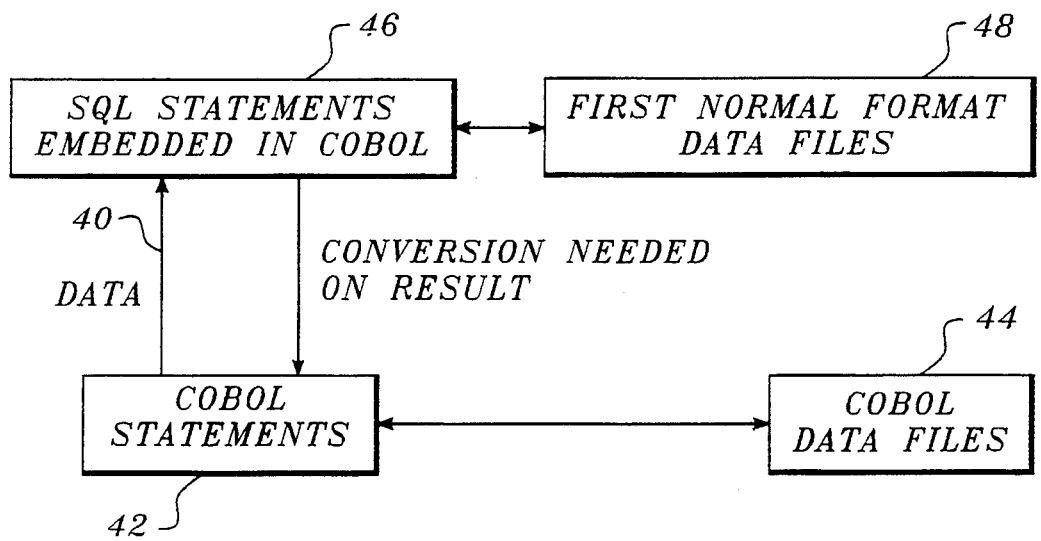
FIG. 2A is a block diagram illustrating the use of SQL statements embedded in COBOL commands.

As noted above in the Background of the Invention, SQL can normally only be used to access data files that are in the first normal format. While the prior art teaches that it is possible to embed a SQL statement in a COBOL statement, this use of SQL is not an interactive one and is very limited in scope by the requirement that the data be in the first normal linear format understood by SQL. This prior art use of embedded SQL in COBOL statements is graphically illustrated in FIG. 2A. Referring to this Figure, a block 46 indicates that SQL statements can readily query and exchange data with first normal format data files, as indicated in a block 48. However, in order to access data contained in COBOL data files (referring to block 44), the SQL statement embedded in a COBOL statement (as indicated in a block 42) can only access a host variable having a description compatible with a 1NF data type and therefore cannot be represented as hierarchical data structures, which is the format commonly used for COBOL. Accordingly, conventional SQL cannot access a COBOL data format variable. FIG. 2C schematically illustrates the problem, i.e., any SQL statements that are interactively input by a user (in a block 52) can only access 1NF data files (in a block 54). It is simply not possible for conventional SQL to access data contained in a typical COBOL data file without first completely modifying the COBOL data file structure so that the data are in the conventional 1NF data file format.

Figure 2B:
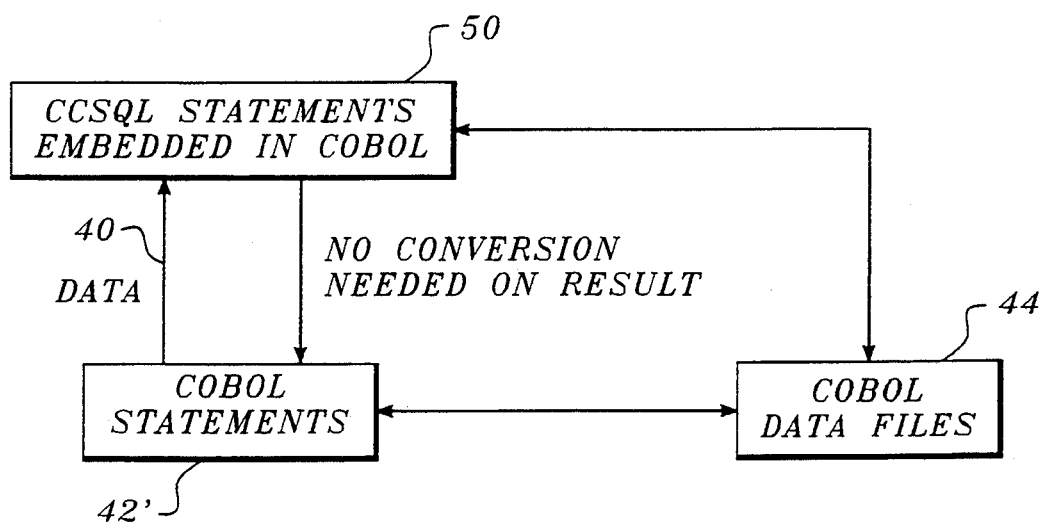
FIG. 2B is a block diagram illustrating the use of CCSQL statements embedded in COBOL commands.
Figure 2C:
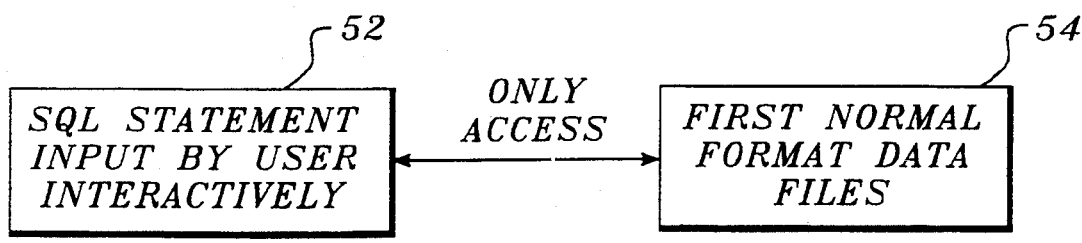
FIG. 2C is a block diagram illustrating the use of SQL statements interactively input by a user.
Figure 2D:
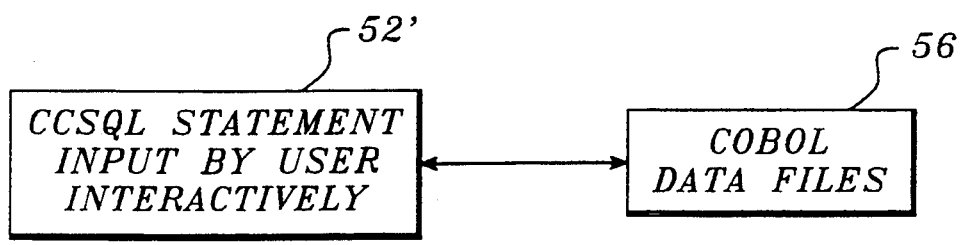
FIG. 2D is a block diagram illustrating the use of CCSQL statements interactively input by a user.

In contrast, as shown in FIG. 2B, the present invention enables CCSQL statements that are embedded in COBOL, as provided in a block 50, to access COBOL data 40 by describing and accessing the COBOL data file directly. As a result, there is no requirement for conversion between the COBOL data type and the data that are returned in response to the SQL embedded in the COBOL statement. In fact, referring to the schematic block diagram of FIG. 2D, it will be evident that the interactively input CCSQL statements (in a block 52') can directly access COBOL data files in a block 56 in substantially the same interactive natural manner that SQL files access 1NF relational database files. This powerful capability is achieved in part, because when the CCSQL system is initially executed, it generates a dictionary for each COBOL data file. These dictionaries define the $NF^2$ hierarchical logical relationships between all of the items in the COBOL data files and their attributes, enabling access of the data using the CCSQL.

Figure 3:
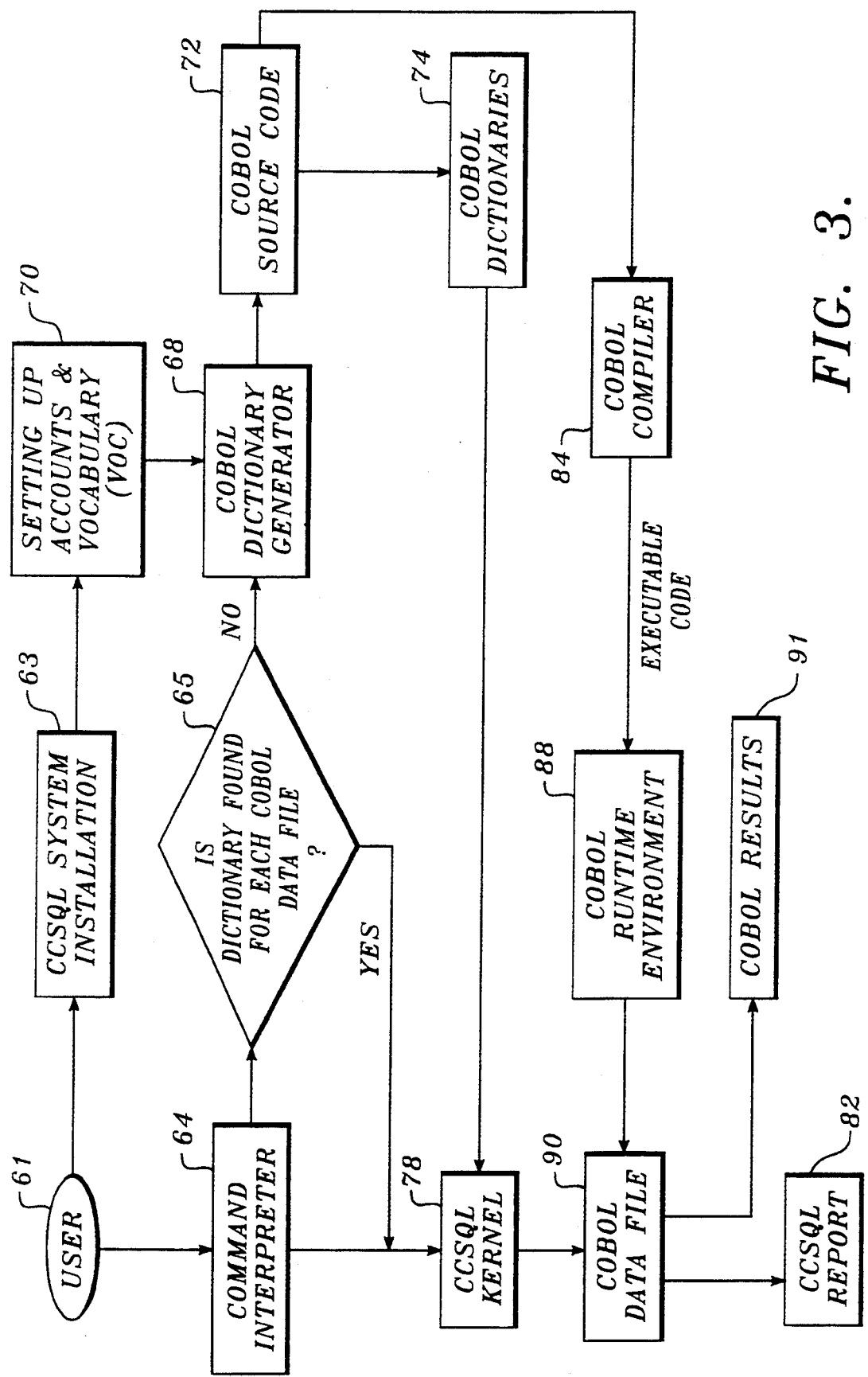
FIG. 3 is a block diagram showing the system architecture of CCSQL and its relationship to COBOL.

The overall system architecture for the CCSQL is illustrated in FIG. 3. When initially installed by a user 61, the CCSQL installation occurring in a block 63 sets up accounts and vocabulary (VOC) files for each COBOL data file as shown in a block 70. In addition, referring to a block 68, a COBOL dictionary generator (DG) scans all of the COBOL source code or programs in the data base system (in a block 72) to determine the COBOL file definitions contained therein and generates a corresponding dictionary in a block 74 for each COBOL data file. Each dictionary defines the hierarchical logical relationship between all items comprising the COBOL data file and the attributes for each item. The attributes include information about an item such as its field name, character length, level, etc.

As shown in the upper left corner of this Figure, user 61 provides a request for data 62 in the form of a CCSQL statement that is initially processed by a command interpreter 64. Command interpreter 64 parses the request to determine its logical content. If (as shown in a decision block 65), a dictionary is not found for each COBOL data file in the data base, for example, because a new COBOL data file was created after the CCSQL system was installed, DG 68 scans the COBOL source code, which contains the definitions of the data items for any such new COBOL data file, and generates a corresponding dictionary. The dictionary enables the new COBOL data file to become accessible through the CCSQL interface, because the CCSQL kernel (in a block 78) uses the dictionaries to "understand" the structures of the Cobol data files. Further details of this process are disclosed below. Each new dictionary created by the DG is added into VOC file (see block 70), which defines the working environment (i.e., operations that can be carried out and file pointers that can be accessed) of CCSQL.

COBOL source code can also provide the initial input to the CCSQL system, leading to a COBOL compiler in a block 84. The COBOL compiler carries out its conventional function of compiling COBOL source code statements, producing executable code 86 that is suitable for execution in a COBOL runtime environment in a block 88. This path does not involve the CCSQL, since it arises only with regard to processing pure COBOL statements. However, if the COBOL statement includes a reference to a COBOL data file, it must be processed through the DG to enable the CCSQL to access this COBOL data file.

The CCSQL query that is parsed is converted to a kernel request in block 78. The CCSQL kernel processor that acts on this parsed expression also makes use of the dictionaries in block 74 to properly handle all references to COBOL data. Based upon the query provided in kernel request 76 and using the data description provided by dictionary 74, CCSQL kernel 78 accesses a COBOL data file in a block 90 to either write or retrieve data from it, producing a result in a block 91. The CCSQL kernel processor represents a CCSQL query in terms of an internal data structure appropriate for execution by the CCSQL kernel processor in block 78 so that the data can be extracted from COBOL data file(s) in block 90 or otherwise manipulated in accordance with the user's instructions. The result of the data manipulation is provided to the user in the form of a CCSQL report in a block 82.

In addition to performing operations that are in response to a CCSQL statement, the COBOL compiler in block 84 also responds to COBOL statements, including those with embedded SQL statements. To handle the embedded SQL statements, the CCSQL processor kernel converts the SQL statements to a compatible structured programming language statement, which in the preferred embodiment is in the C language, using a library of corresponding C language functions. These C language statements are then processed through a C compiler using the COBOL dictionaries corresponding to any COBOL data files that must be accessed to carry out the requested data manipulation as part of the compilation process normally implemented by the COBOL compiler in block 84. The resulting executable code is readily run by the COBOL runtime environment, as indicated in block 88.

The data manipulation carried out by the COBOL runtime environment 88 can manipulate data, either adding to, deleting, or extracting data from COBOL data files 90, in response to the appropriate COBOL data manipulation statement. In a broader sense, the data manipulation can be carried out in response to a request includes the following $NF^2$ relational algebra operations: (a) forming a union of data items; (b) forming an intersection of data items; (c) determining a difference between data items; (d) determining a Cartesian product of data items; (e) determining a projection of data items; (f) performing a natural join of data items; (g) performing a nest of data items; and (h) performing an unnest of data items. The interaction of COBOL runtime environment 88 with COBOL data file 90 is independent of the present invention.

Figure 5:
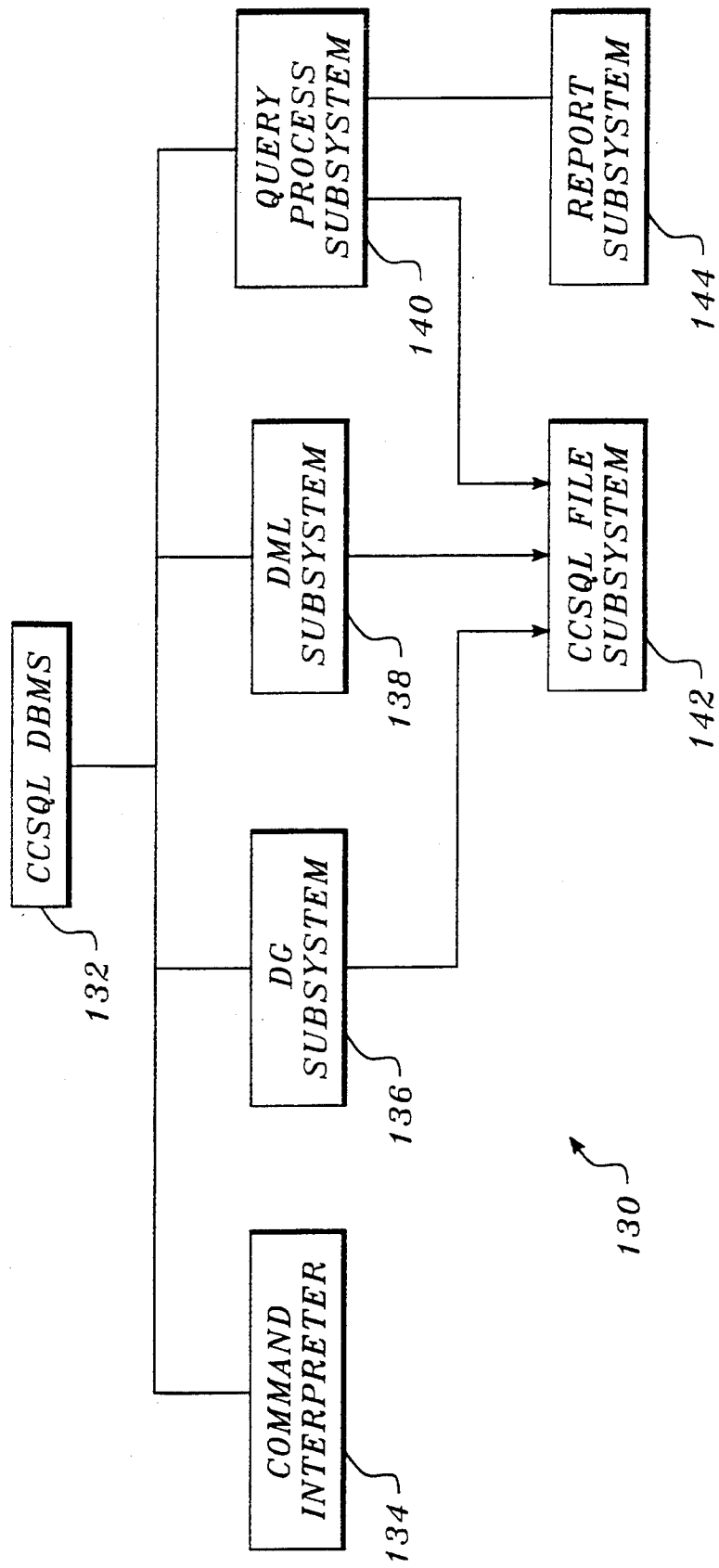
FIG. 5 is a block diagram showing the system modules comprising CCSQL.

Functionally, the CCSQL kernel processor that operates on the request in block 78 comprises a plurality of subsystems, as shown in FIG. 5. At the top of this functional diagram is a block 132 comprising the CCSQL database management system (DBMS). A block 134 for command interpreter 64 is included in the Figure, but is actually outside of the scope of the CCSQL kernel processor; it is included because the command interpreter first parses the CCSQL statements to determine the appropriate subsystem to process a user input. A DG subsystem 136 is responsible for defining all items in a COBOL data file in an appropriate format to be handled by the CCSQL kernel processor by producing appropriate dictionaries for each COBOL data file, which are available to CCSQL file subsystem 142. The CCSQL file subsystem also responds to a data manipulation language subsystem 138, comprising a second functional portion of the CCSQL kernel processor. Finally, a query process subsystem 140 implements commands that request data from the COBOL database by accessing CCSQL file subsystem 142 through which the data are extracted from COBOL data files 90. Query process subsystem 140 then calls a report subsystem 144 to generate the report, which may include data extracted in response to the query input by the user.

Figure 4:
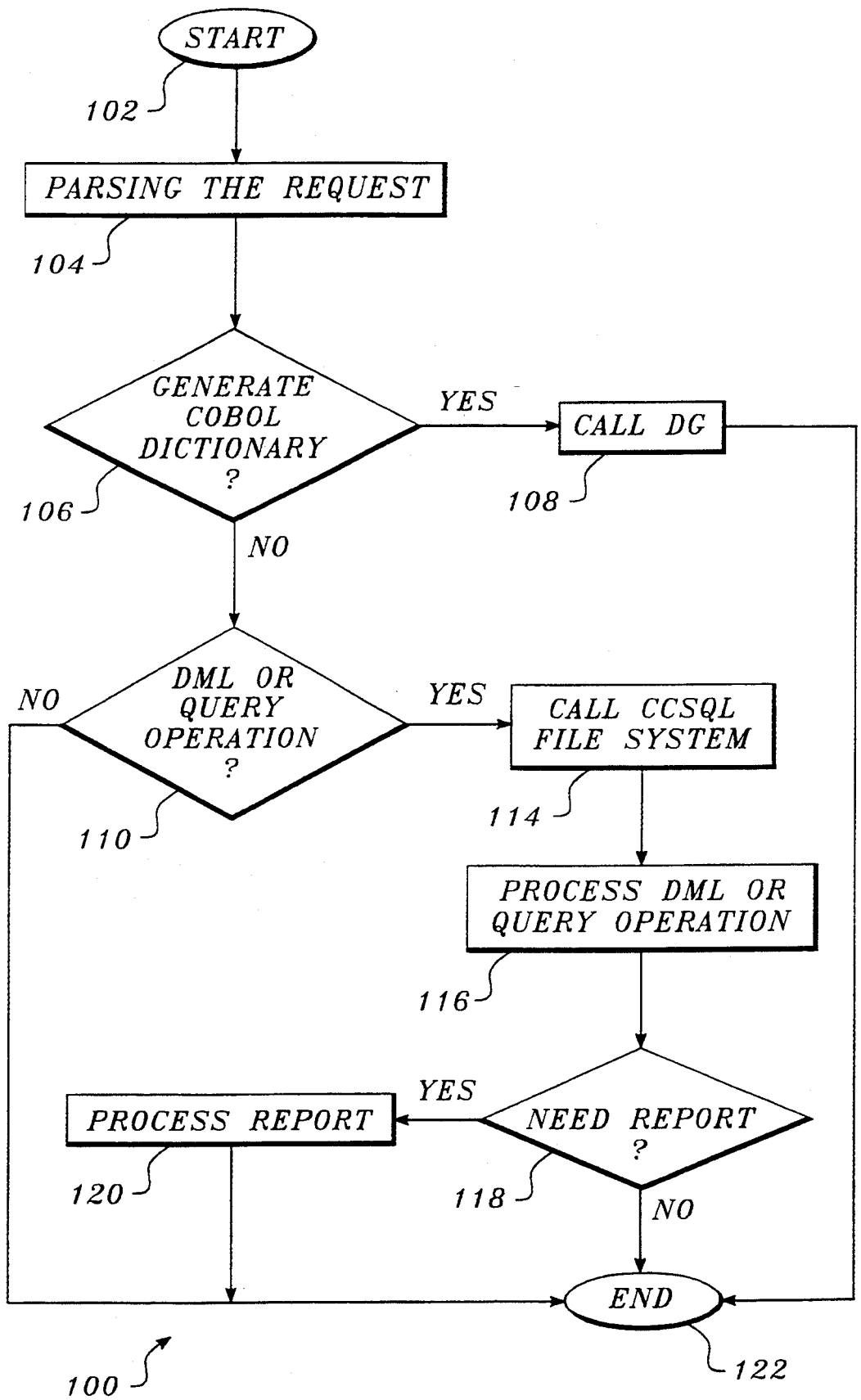
FIG. 4 is a flow chart illustrating the logic for system control of CCSQL.

An overview of the logic involved in processing a user CCSQL request is disclosed in FIG. 4 in a flow chart 100. Beginning at a start block 102, command interpreter 64 (shown in FIG. 3) parses the input, which is in the form of text lines entered by the user, for example, at one of the client terminals 14, in response to a CCSQL prompt appearing on the client terminal. These text lines are placed in a buffer, i.e., in RAM 30 of server 12 (shown in FIG. 1), held in a queue that is more appropriately referred to as a "command stack." A user indicates the end of a request with a "semicolon" entered at the end of an input text line, and then demands execution of the request. As shown in a block 104, the command interpreter parses the text lines from the command stack into a corresponding internal representation, comprising a data structure called "SQL_FRAME." The SQL$_{13}$ FRAME retains all of the information necessary for completing the user request and is transferred into another data structure called a "NODE" for further processing. A decision block 106 then determines if it will be necessary to create additional dictionaries in order to process the request, and if so, calls DG 68, as noted in a block 108. Assuming there are no further aspects of the request that require processing, the logic continues to end block 122. Although not specifically indicated in FIG. 4, the logic also may proceed with any further action to process the request, leading to a decision block 110. This action is also taken if it is not necessary to generate a dictionary (in decision block 106). Decision block 110 determines if the request involves data manipulation language or query processing. If so, the logic proceeds to a block 114, wherein the CCSQL file system is called in order to process the data manipulation language or query operation, as indicated in a block 116. If the response to the inquiry in decision block 110 is negative, the logic again proceeds to end block 122.

After completing the data manipulation language or query processing in block 116, a decision block 118 determines if it is necessary to produce a report that includes the results of the processing. If so, the report is generated, as indicated in a block 120, and thereafter, processing of the user request concludes in end block 122. Otherwise, the logic proceeds directly to end block 122.

It will be apparent that one of the more important aspects of the manner in which CCSQL requests are handled is the creation of dictionaries carried out by DG 68. In order to understand this conversion, it is necessary to first review the dictionary organization. A CCSQL dictionary includes a set of field descriptions that are used for each data item. The data structure used to describe each item is referred to as DIC_REC, which includes all of the attributes of a corresponding field defined in a COBOL source program. The type definition structure of DIC_REC is as follows:

```
typedef struct DIC-REC {
    char  fname [_FSIZE];   /* field name
                             */
    short level;
                            /* level of the field in FILE
                             * section of COBOL source code
                             */
    char  pic[_PICSIZE];    /* picture clause which describes
                             * the features of this field
                             */
    int   length;           /* length of the field
                             */
    ....                    /* auxiliary information for
                             * query processing
                             */
} DIC_REC;
```

Another data structure referred to as "TREE_SPE" is used to represent the relation of the fields in a dictionary, thereby more efficiently referencing the fields. When a dictionary is opened, the definition of each field is read into an array of the DIC_REC structure. The "dic" field in TREE_SPE identifies the subscript of this field in the DIC_REC array. The type definition structure for TREE_SPE is as follows:

```
typedef struct TREE_SPE {
    int dic;                /* index in DIC_REC array which
                             * stores detailed information
                             * of each field
                             */
    struct TREE_SPE*brth;   /* next field subordinate to
                             * the same group item
                             */
                            /* if the present node is group item,
    struct TREE_SPE*son;    * it points to items subordinate to
                            *this group item; otherwise it is
                            *null.
                            */
    ....                    /* auxiliary information for
                             * query processing
                             */
}TREE_SPE;
```

Figure 8:
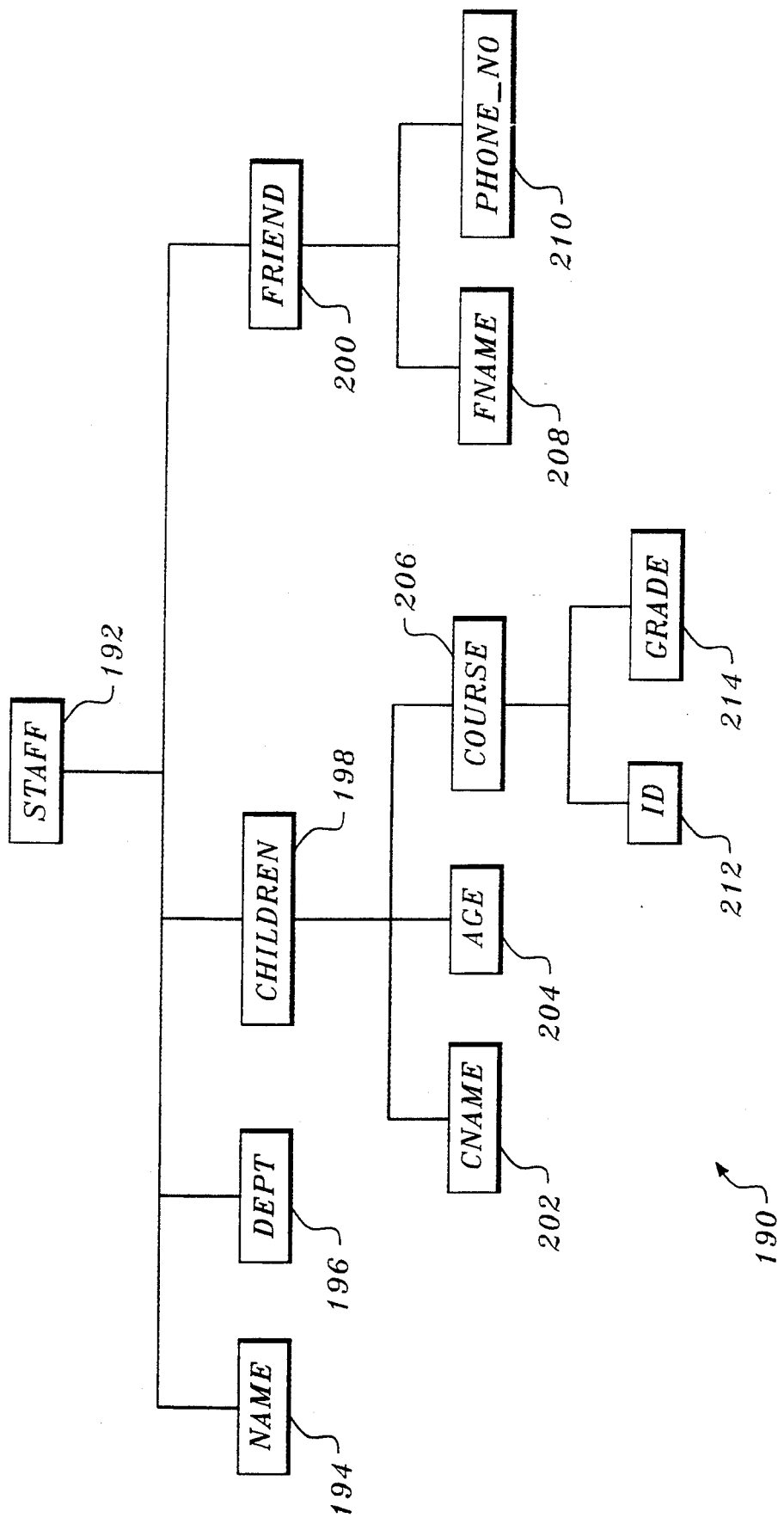
FIG. 8 an exemplary block diagram of the relations for the table STAFF.

For an example of a relation that may help to clarify how a dictionary is configured, refer to FIG. 8, wherein a graphical relationship for a table STAFF 192 is disclosed by a tree structure 190. In this example, the items: NAME 194, DEPARTMENT 196, CHILDREN'S NAME (CNAME) 202, AGE 204, FAMILY NAME (FNAME) 208, and PHONE NUMBER 210 are elementary items, while CHILDREN 198, COURSE 206, and FRIEND 200 are group items. Similarly, ID 212 and GRADE 214 are elementary items, because they represent subdivisions of a record that cannot be subdivided. In contrast, the group items listed above comprise a named sequence of elementary items or group items. It should be evident that in tree 190, each of the leaf nodes identify elementary items, while other nodes are associated with group items. A STAFF record could also be represented by the following outline, which illustrates the hierarchical format in which the items comprising the record are stored as COBOL data:

```
01 STAFF
    02 NAME PIC X(20)
    02 DEPARTMENT X(10)
    02 CHILDREN OCCURS 3 TIMES
        03 CNAME X(20)
        03 AGE PIC N(2)
        03 COURSE OCCURS 3 TIMES
            04 ID PIC
            04 GRADE X(2)
    02 FRIEND OCCURS 2 TIMES
        03 FNAME x(20)
        03 PHONE_NO N(7)
```

In the above outline, the relative level of an item to the other items is indicated by the prefixes 01-04 assigned to it. The above representation of a COBOL record is described by a corresponding dictionary based on the type definition structure TREE_SPE.

Figure 9:
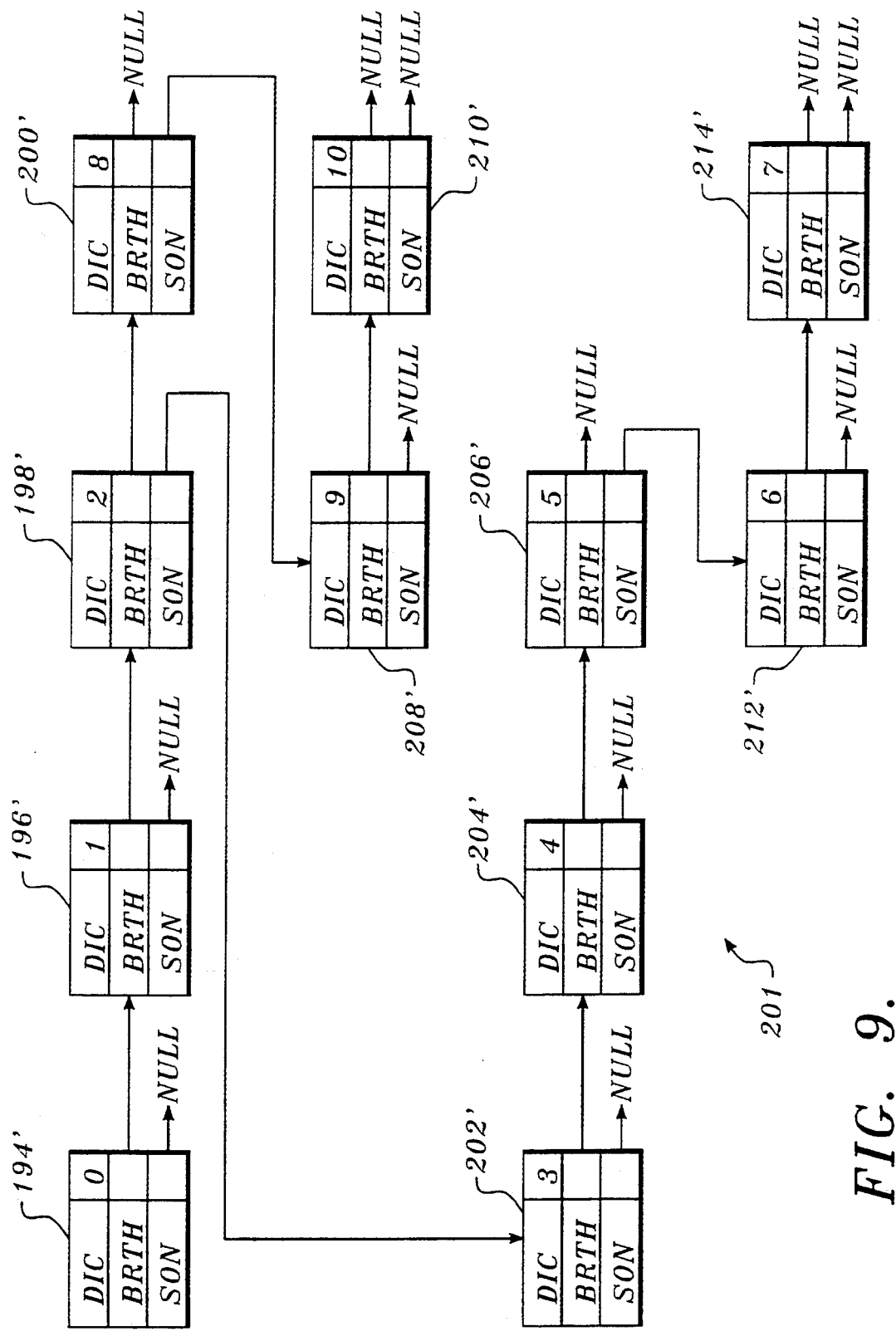
FIG. 9 is a block diagram that schematically defines a tree relationship, TREE_SPE, for the fields of STAFF.

The form of the dictionary definition is easier to understand in connection with the representation of FIG. 8. The dictionary is developed as shown in FIG. 9 by a graphical description 200 of the fields in the record STAFF. Identical reference numbers with primes added are used to show the correspondence between the graphical representation of the COBOL data in FIG. 8 and the dictionary fields of FIG. 9, which comprise the dictionary.

A dictionary field 194'0 represents NAME 194, which as shown in FIG. 8, has no "son" relationship with other data items. Similarly, a dictionary field 196' corresponding to DEPARTMENT 196 also has no son. However, both dictionary fields 198' and 200', corresponding to CHILDREN 198 and FRIEND 200, respectively, both have sons. Dictionary field 198' has a son, comprising a dictionary field 202'. Dictionary field 202', which corresponds to CHILD'S NAME 202, has no son, nor does a dictionary field 204', corresponding to AGE 204. However, a dictionary field 206', corresponding to COURSE 206, has two sons, including a dictionary field 212' and a dictionary field 214', corresponding respectively to ID 212 and GRADE 214. Neither of these latter two dictionary fields have sons. Dictionary field 200' includes two sons, corresponding to dictionary fields 208' and 210', representing FIRST NAME 208 and PHONE NUMBER 210, respectively. These dictionary fields define the attributes of each item in the COBOL hierarchical data, indicating the relationship of that item to all others so that CCSQL can handle the data items in a logical manner.

Figure 6:
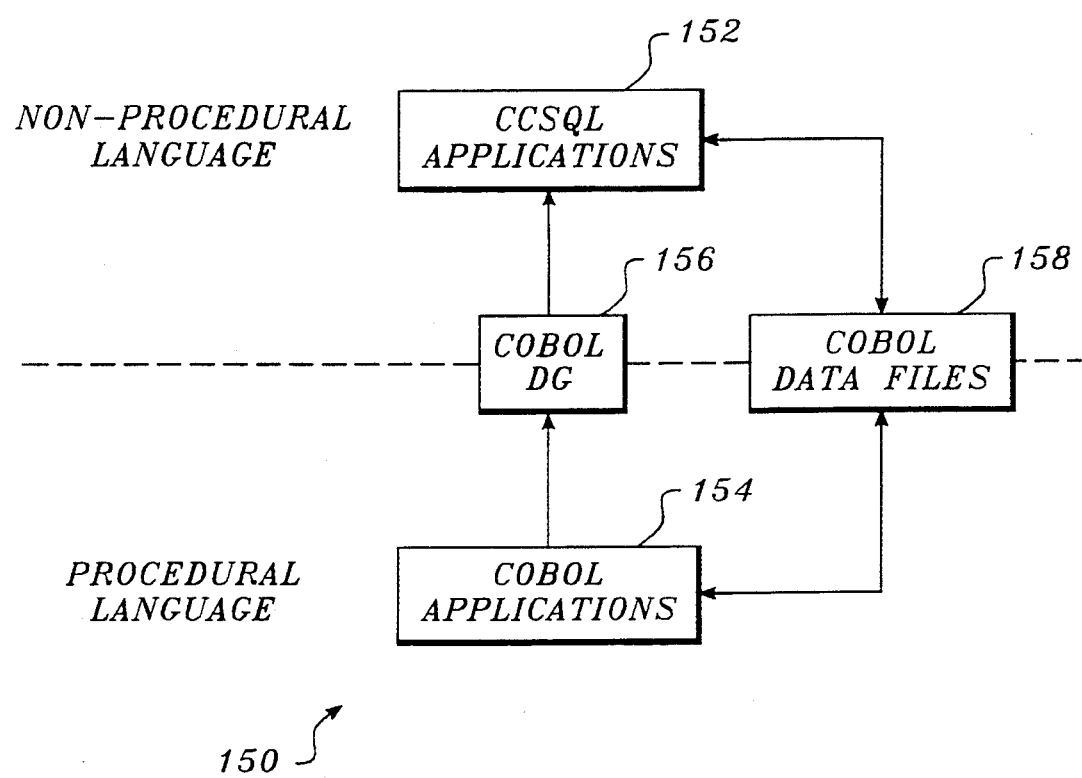
FIG. 6 is a functional block diagram of the dictionary generator.

The DG thus represents a bridge between the COBOL data files and CCSQL. As indicated in a block diagram 150, shown in FIG. 6, CCSQL can access and even modify the COBOL data file after the corresponding dictionary for that data file is created, yet COBOL applications can continue to access the same data file in their normal manner because the format of the COBOL data file has not been changed. As a result, both the CCSQL applications and the COBOL applications can readily access and modify the same COBOL data file without requiring any conversion in data format.

Figure 7:
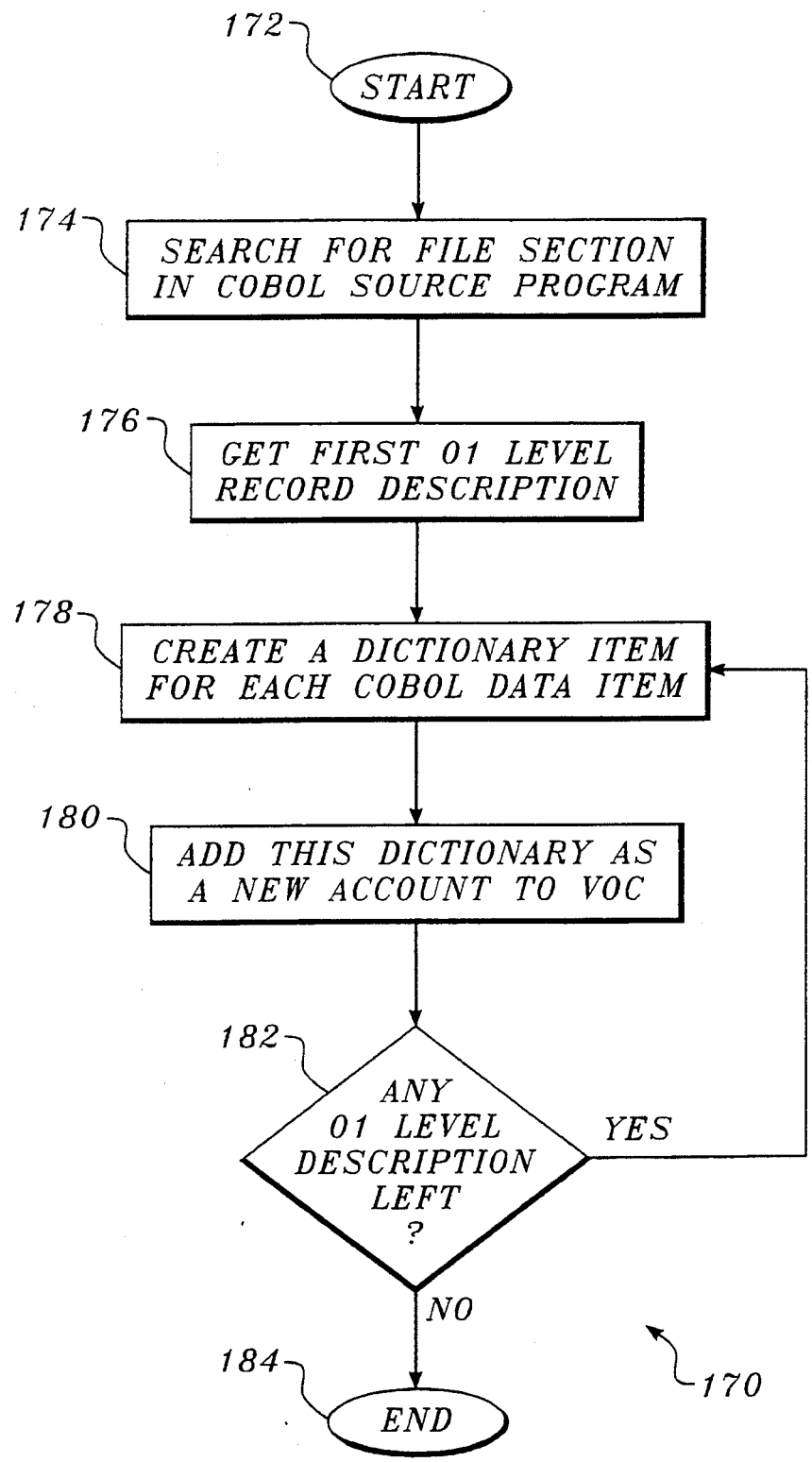
FIG. 7 is a flow chart showing the logic used in the control of the dictionary generator (DG)

Details of the logic implemented by the DG are illustrated in a flow chart 170 in FIG. 7, beginning at a start block 172. In a block 174, the logic initiates a search for a file section in the COBOL source program that is to be scanned in order to generate the corresponding dictionary. In a block 176, the first or 01 level item description is obtained from the record. In the example presented, the level 01 record would correspond to STAFF 192. Then, in a block 178, a dictionary field like that represented in FIG. 9 is created for each COBOL data item. The dictionary containing these fields is then added into the VOC file(s) in a block 180.

In a decision block 182, the logic determines if there is any additional items at the 01 level remaining to be processed and if so, returns to block 178 to create a dictionary field for the remaining COBOL data items at that level. Otherwise, the logic completes its processing in end block 184. By extracting each COBOL data item from its non-first normal relational structure and defining it in a dictionary field using the method described above, the CCSQL can access the item with knowledge of its relationship to other items.

The CCSQL query subsystem derives a resultant table (i.e., a formatted representation) by selecting specific items from one or more COBOL data files, subject to specified criteria. In order to facilitate this process, the conventional syntax of SQL has been extended to include some additional operations such as UNNEST, which is used to "flatten" non-first normal format records, have been introduced to manipulate COBOL data files. When a query statement is input by the user, it is parsed to define a SQL SFW_EXPRESSION (a query statement that contains Select, From, and Where clauses). This operation involves applying the UNNEST command to the query statement with reference to the items appearing in a Select clause. The SFW_EXPRESSION is evaluated by selecting items from one or more COBOL data files meeting any Where conditions that are provided, and these items are grouped to form a class in which all items meet the specified condition.

Once a CCSQL statement has been parsed, useful information derived from it is placed in a data structure referred to as SQL_FRAME, which is defined as follows:

```
typedef struct SQL_FRAME {
    int     type;   /* QUERY ⇒ normal query
                     * UNNEST ⇒ query with
    unnest           * clause
                     */
    union {
        struct QUERY    /* query;
        struct UNNEST    * unnest;
        struct SETOP     * setop;
    } union;
} SQL-FRAME
```

In the definition of SQL_FRAME, three additional structures are referenced including QUERY, UNNEST, and SETOP. These three structures are defined as follows:

```
typedef struct QUERY {
    struct COLUMN   *column;    /* field or expression fist.
                                 * each node in list represents
                                 * a selected item, which could
                                 be
                                 * a field name or expression
                                 */
    struct TABLE    *table;     /* table fist.
                                 * each node in fist could be
                                 * a table name or a table with
                                 * UNNEST operation on it
                                 */
    struct CSTACK   *where;     /* where condition stack.
                                 * conditions are interrelated
                                 * by logic operators.
                                 * each item in condition stack
```

```
                                    * is a relation expression
                                    * in which every operand could
                                    * be a field name, expression, or
                                    * subquery
                                    */
    struct GROUP    *group;         /* group by clause
                                    */
    struct CSTACK   *having;        /* having condition stack.
                                    * conditions related to group
                                    * by items
                                    */
} QUERY;
typedef struct UNNEST {
    char    field[FSIZE];           /* name of the field to be
                                    * unnested
                                    */
    char    **rename;               /* rename list
                                    * after unnest operation,
                                    * several fields will be
generated, so
                                    * rename them
    struct SQL_FRAME *frame;        /* query expression to be
                                    * unnested
                                    *
} UNNEST;
typedef struct SETOP {
    int     type;                   * UNION, DIFFERENCE or
                                    *INTERSECT
                                    */
    struct SQL_FRAME *left;         /* left operand
                                    */
    struct SQL_FRAME *right;        /* right operand
                                    */
} SETOP;
```

It is important to carry out a frame-to-node conversion at this point to convert SQL_frame structure to the NODE structure. During this conversion, all dictionaries of any referenced COBOL data files are opened. TREE_SPE and DIC_REC arrays for each table are created and a REL_TYPE structure, which describes a relation between data items, is established for each table. The select list of the final query and subqueries are also treated as a relation and are described by REL_TYPE structures.

If "views" (virtual data files, which are derived by executing one or more CCSQL statements) are used in the query or subqueries, they are processed first. To the user, a view appears to be a real data file; however, a view does not actually contain data items. Instead, it contains pointers to selected data items in one or more COBOL data files. A view can be used in carrying out almost any type of data manipulation operation that is normally applied to data items, such as a Join, a Union, a Cartesian Product, etc., as discussed above.

A semantic check is made of the field names and expressions, to ensure that each field points to an appropriate node in the dictionary tree (TREE_SPE). Any flags for a Join, Cartesian product, repeated query, or other operation are set. The condition stacks defined by the query are optimized by using a cost tree in which each condition is assigned a cost according to predefined rules. Based upon the relative levels of these costs, the evaluation is carried out in a corresponding order. Any information related to a query or temporary result is referenced through NODE, and operations actually applied on a NODE to generate the final result. The NODE structure is defined as follows:

```
typedef struct NODE {
    int     type;           /* QUERY, UNNEST, SETOP
                            */
    int     subi;           /* index to SUBQHEAD array,
                            * which registers the
                            * intermediate file names,
                            * file pointers, etc., for query
                            * (or subquery) on this NODE
                            */
    int     hsubi;          /* index to SUBQHEAD array
for
                            * condition check
                            */
    int     old_rel;        /* after unnest operation, used to
                            * keep the original relation
                            * entry in REL_TYPE array
    int     process;        /* denotes the processing status
                            * of this NODE
                            * START ⇒ start processing
                            * REPEAT ⇒ repeated query
                            * PASSED ⇒ after repeated
                            * query being processed first
                            * time
                            * FINISHED ⇒ finish
```

```
        processing
        union {
                struct N_QUERY   *query;     /* SFW_expression
                                              */
                struct NODE      *unnest;    /* NODE to be unnested.
                                              * unnest is processed by
creating
                                              * a new relation according to
                                              * the old relation and unnest
                                              * requirements provided by
                                              * UNNEST structure
                                              */
        } union;
        ....                                 /* other flags and auxiliary data
                                              * structures for query, unnest,
        etc.
                                              */
}NODE;
```

Included in the definition of NODE structure are structural definitions for N_SETOP and N_QUERY. These structures are defined as follows:

The definitions of the above two structures include references to additional structures, which are defined as follows:

```
typedef struct N_SETOP {
        int              type;       /* UNION, DIFFERENCE,
                                      * INTERSECT
        struct NODE      *left;      /* left operand
                                      */
        struct NODE      *right;     /* right operand
                                      */
} N_SETOP
typedef struct N-QUERY
        struct N_COLUMN  *column     /* fields can be referenced by
                                      * pointers to TRE-SPE and
                                      * DIC-REC array. Expressions
                                      * organized as a tree in which
each
                                      * node can be a constant or a
                                      * pointer to reference certain
fields
                                      */
        struct N_TABLE   *table      /* tables to be selected;
                                      */
        struct N_CSTACK  *where      /* where condition stack
                                      */
        struct N_CSTACK  *having     /* having condition stack
                                      */
        struct N_GROUP   *group      /* group by columns
                                      *
        struct VIR_STACK *vhstack    /* virtual stack for having
condition
                                      */
        struct GFUNC_LIST *gfunc     /* store intermediate and final
                                      * results of group functions
                                      */
} N_QUERY;
```

```
typedef struct N_TABLE
        int              index;              /* index in REL_TYPE array
                                              */
        int              joined              /* flag indicating whether the
        table
                                              * has been used in a join
        int              oldrel;             /* index in REL_TYPE array
        before
                                              * unnest operation
                                              */
        struct N_TABLE   *next               /* next table in FROM clause
                                              */
}N_TABLE;
typedef struct REL_TYPE
                                             /* data structure for keeping
                                              * complete information of a
        relation
                                              */
        char             relname[_NAMESZ];   /* the name of relation;
        temporary
```

```
                                          * relation has no name
    char       realname[__NAMESZ];        /* the name registered in VOC
    file
                                          */
    char       label[__NAMESZ];           /* reference name in FROM
    clause
                                          * or unnest clause
                                          */
    int        ftype;                     /* flag indicating if the file is:
                                          * 1. COBOL line sequential
    file;
                                          * 2. COBOL record sequential
    file;
                                          * 3. COBOL indexed file; or
                                          * 4. COBOL relative file
                                          */
    int        reclen;                    /* the length of a record
                                          */
    int        minreclen;                 /* the minimum length for the
                                          * records when variable length
                                          * records exist
                                          */
    struct TRE__SPE  *tree                /* dictionary tree
                                          */
    struct DIC__REC  **dic;               /* DIC__REC array for keeping
                                          * detailed information of each
    field
                                          */
    short      count;                     /* total number of fields for
    index
                                          * file, file management, and
    other
                                          * temporary structure, etc.
                                          */
    ....                                  /* other information for index
    file.
                                          * file management, and other
                                          * temporary structure, etc.
                                          */
} REL__TYPE;
```

Figure 10:
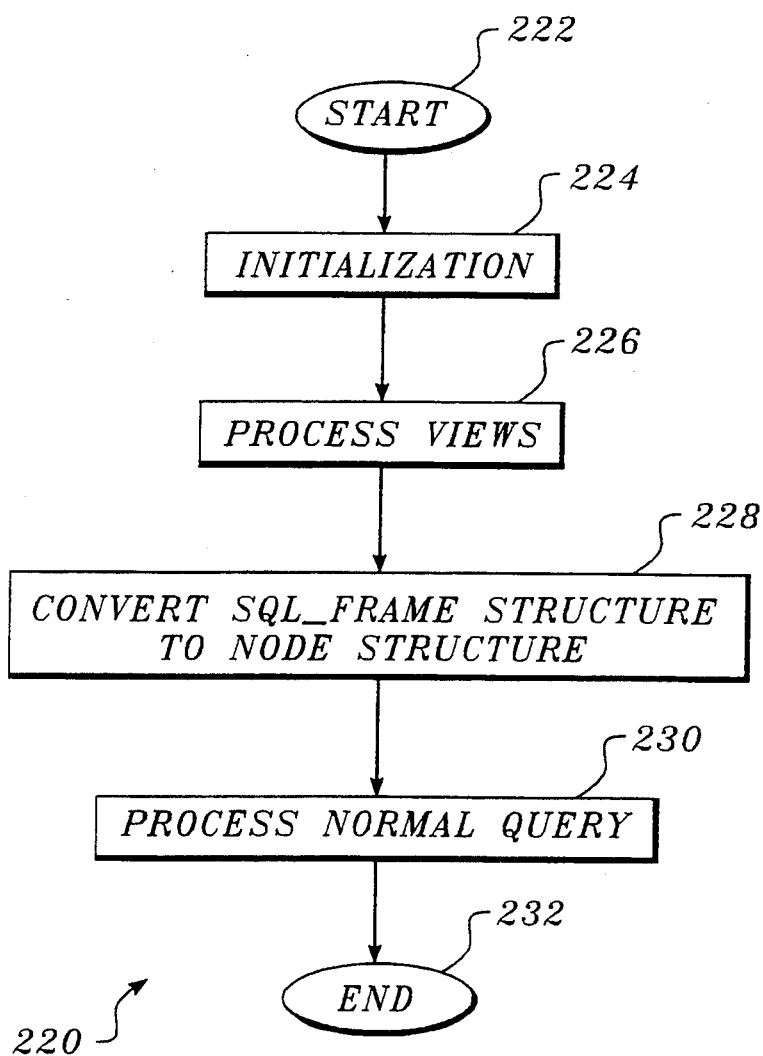
FIG. 10 is a flow chart that includes the steps used in controlling the query subsystem of CCSQL.

When SQL__FRAME is passed to a query subsystem, the main query routine is called and undertakes the logical steps disclosed in a flowchart 220, as shown in FIG. 10. Beginning at a start block 222, the logic proceeds to an initialization step, in a block 224. The initialization sets up the query environment, and processes the views involved in the query, as described below in FIG. 11 and as indicated in a block 226. Next, in a block 228, the logic converts the SQL__FRAME structure to a NODE structure, and retrieves items that satisfy each of the query conditions (see FIG. 12). This step, which is shown in a block 230, corresponds to the normal processing of a query. After the step is completed, the logic proceeds to an end block 232.

Figure 11:
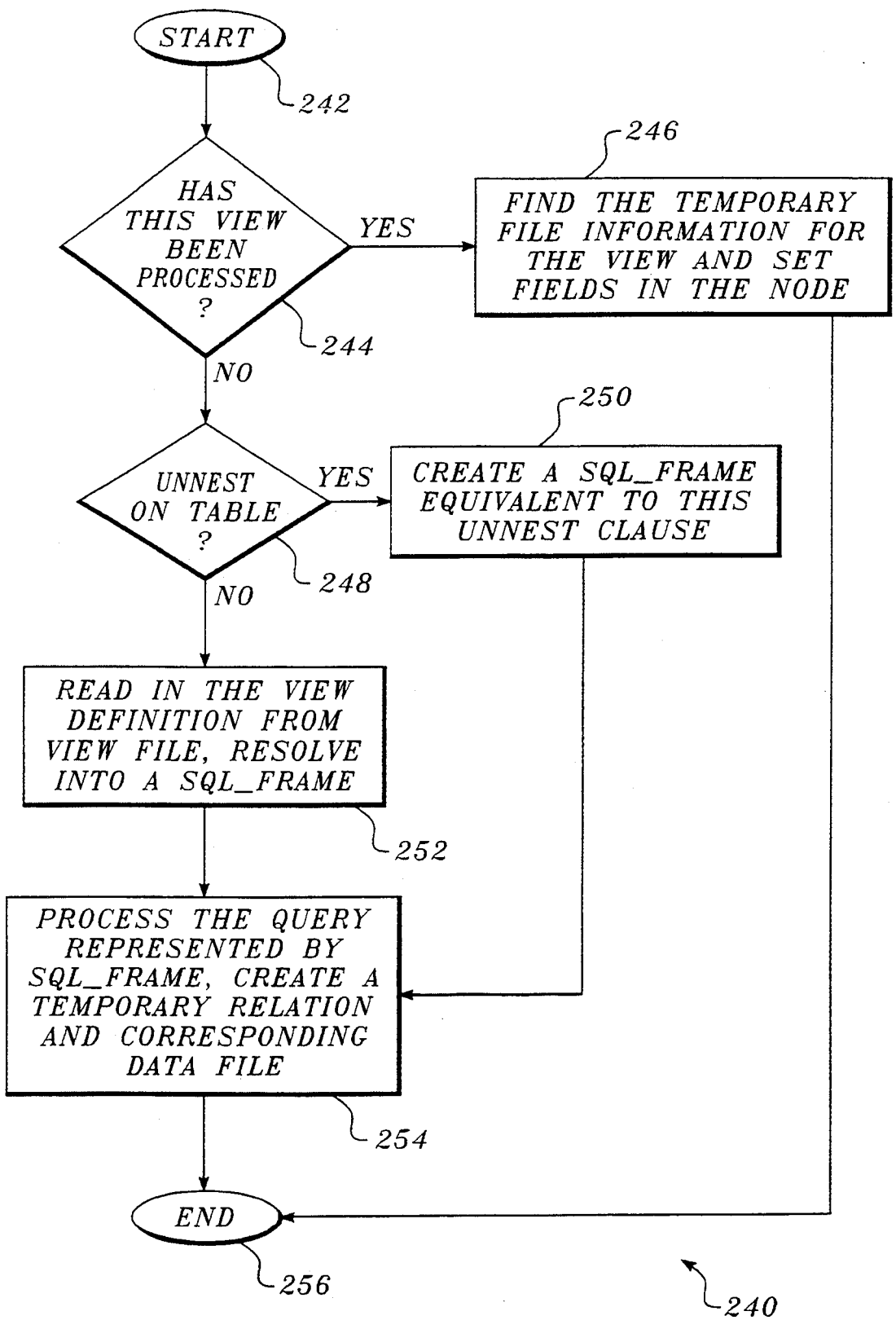
FIG. 11 is a flow chart that includes the steps for view processing.

Referring now to FIG. 11, details of the logic involved in processing views is illustrated in a flow chart 240, beginning at a block 242. A decision block 244 determines if an existing view has already been processed, and if so, a block 246 determines the temporary file information for the view and sets at least some of the fields in the NODE structure. Thereafter, the logic proceeds to an end block 256. However, if the view has not been processed, the logic proceeds to a decision block 248, which determines whether it is necessary to unnest a table. Since UNNEST could appear in a FROM clause, it is treated just as a view would be; for example, if an item in a FROM clause is a transformed file, an expression for R is represented as: UNNEST (UNNEST) (R) ON . . . ) ON . . . , . In the above expression, R can also be a view. In dealing with this expression, a SQL__FRAME structure is generated, representing a CCSQL query statement of the form: UNNEST (UNNEST) SELECT*FROM R) ON . . . ) ON . . . , which is equivalent to that in the FROM clause. (See block 250.) This query statement is then processed as a normal view in a block 254. The only difference is that at the SQL__FRAME is directly generated instead of resolving it from a view definition. In addition, the information of this assumed view is not stored in a view definition file.

If the inquiry in decision block 248 produces a negative response, the logic proceeds to a block 252, which reads in the view definition from a view file, resolving it into a SQL__FRAME. After processing the view, a new table is created as a relation and the query results of the view are saved in a temporary file. This relation can be referenced as a normal relation in further processing. The logic then terminates at an end block 256.

Figure 12:
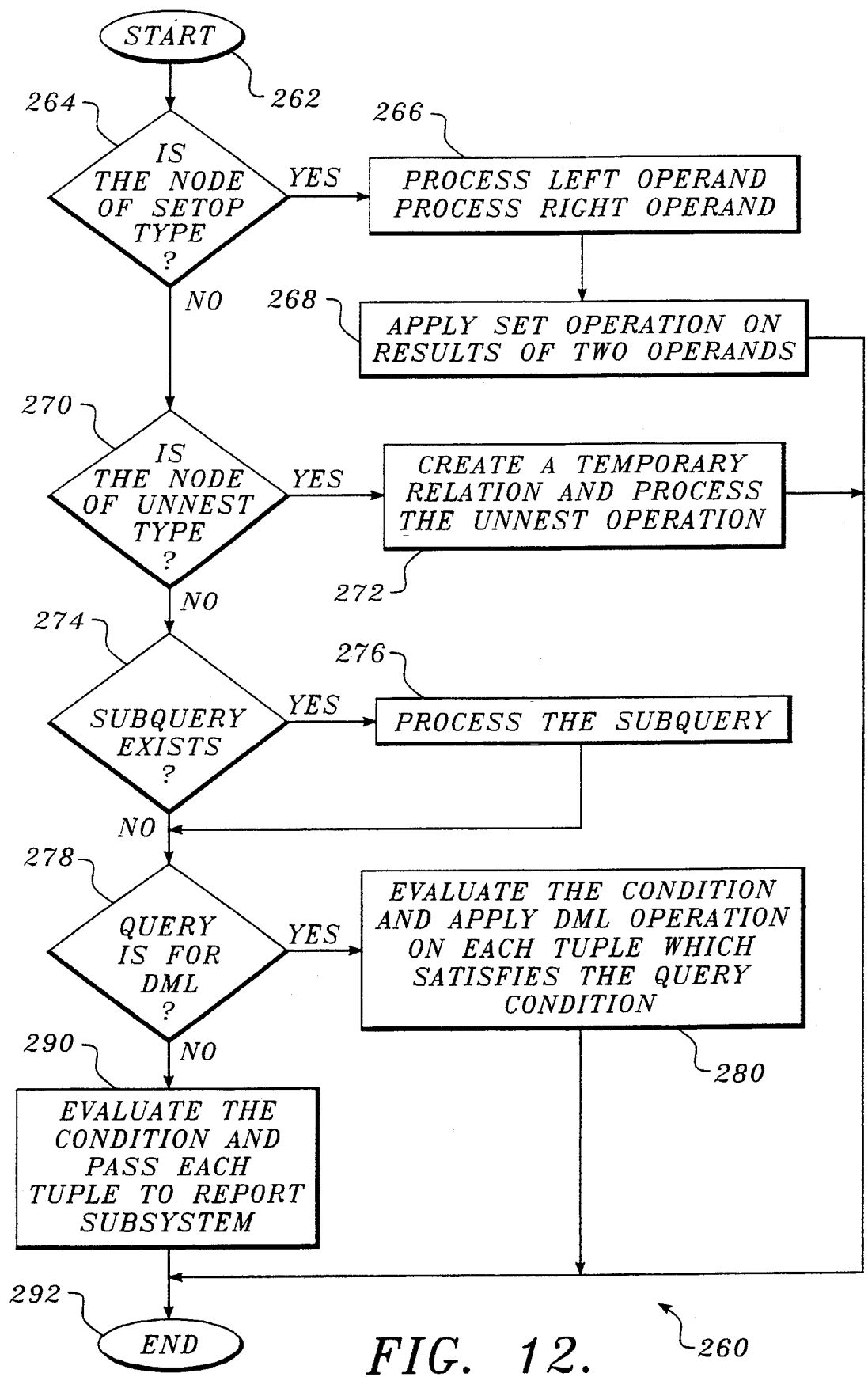
FIG. 12 is a flow chart illustrating the main routine for query processing.

The main logic routine for query processing is illustrated in a flow chart 260, shown in FIG. 12. Beginning with a start block 262, the logic proceeds to a decision block 264, which determines if the NODE is of the SETOP type. If so, in a block 266, the left and right node operands are processed following the above steps and are then combined according to the type of Set operation in a block 268. The logic then proceeds to an end block 292. However, returning to decision block 264, if the NODE is not of the SETOP type, a decision block 270 then determines if the NODE is of the UNNEST type. If so, in a block 272, a new relation is created based upon the resultant relation of the query. The UNNEST information is added on that relation, each time an item is generated by the query. This UNNEST operation is applied directly to the item without putting it into a temporary file. Thereafter, the logic again proceeds to end block 292.

If the NODE is not of the UNNEST type, the logic proceeds from decision block 270 to a decision block 274, which determines if a subquery exists. If so, the subquery is processed in the same way as a normal query would be, in a block 276; then, the logic returns to a decision block 278. Similarly, if no subquery exists, the logic proceeds directly to decision block 278, which determines if the query is for a data manipulation language operation, It should also be noted that in block 276, subqueries that contain a "where condition" are evaluated after the subquery is processed in accordance to the procedures applied to a normal query. If a "group function" or a "group by" clause appears in a query, the group information is stored in predefined data structures. For a "group by" clause that includes an "if having condition," all groups that do not satisfy the condition are eliminated.

An affirmative response to decision block 278 leads to a block 280 to evaluate the condition contained in the query and to apply the data manipulation language operation to each item that satisfies the query condition. Thereafter, the logic again proceeds to end block 292. Finally, if the query is not related to any data manipulation language operation, a block 290 evaluates the condition and passes each item that satisfies it to the report subsystem. Thereafter, the logic concludes at end block 292.

Data manipulation language subsystem 138 carries out various operations in accordance with query statements, including commands for INSERT, DELETE, and UPDATE, each of which operate on a data item of the COBOL data files. If a data manipulation language statement is executed without a condition, it simply calls a specific routine to carry out the required operation. If a condition is stated, however, the data manipulation language statement is embedded in a query process and starts the query routine that applies the appropriate operation on each item that satisfies the condition.

The INSERT command inserts items into a selected table. If it is called with a query statement, it inserts one item into the named table for each item that it obtains from the query; otherwise, it inserts an item with the specified value at the indicated column. The value of the $i_{th}$ column of the item in the derived table, or the $i_{th}$ value in the VALUES clause is assigned to the $i_{th}$ column of the table. Omitting a reference to a column is equivalent to specifying all the columns of the table, in ascending order. When INSERT occurs in a query statement, the query process routine is called and instead of passing the resultant item to the report subsystem, the logic rebuilds an item according to the INSERT requirement and then inserts the item into the table.

The DELETE command deletes any items from a named table that satisfy a "Where condition." If the Where condition is omitted, all items are deleted from the named table. When a Where condition is stated, the query process routine is called and any items that satisfy the condition are deleted.

The UPDATE command updates items in a named table. Each column identified corresponds to a column that is to be updated. If a Where condition is omitted from the statement, all items are updated. However, when a Where condition is included in a statement, a query process routine is called and any items that satisfy the condition are updated.

The CCSQL file subsystem comprises functions for reading from and writing to a COBOL file and carries out operations related to file control such as locking the file. There are four types of COBOL files that are supported in CCSQL including line sequential, record sequential, indexed, and relative.

When reading an item, it is locked, its validity is checked, and an appropriate routine is called according to the type of file. After the item is read, the lock is released. Conversely, when writing an item to a data file, if the file is indexed, the item is added to a free block. Otherwise, it is added to the end of the file. The logic employed in reading and writing to COBOL data files in the CCSQL are illustrated in FIGS. 13 and 14, respectively.

Figure 13:
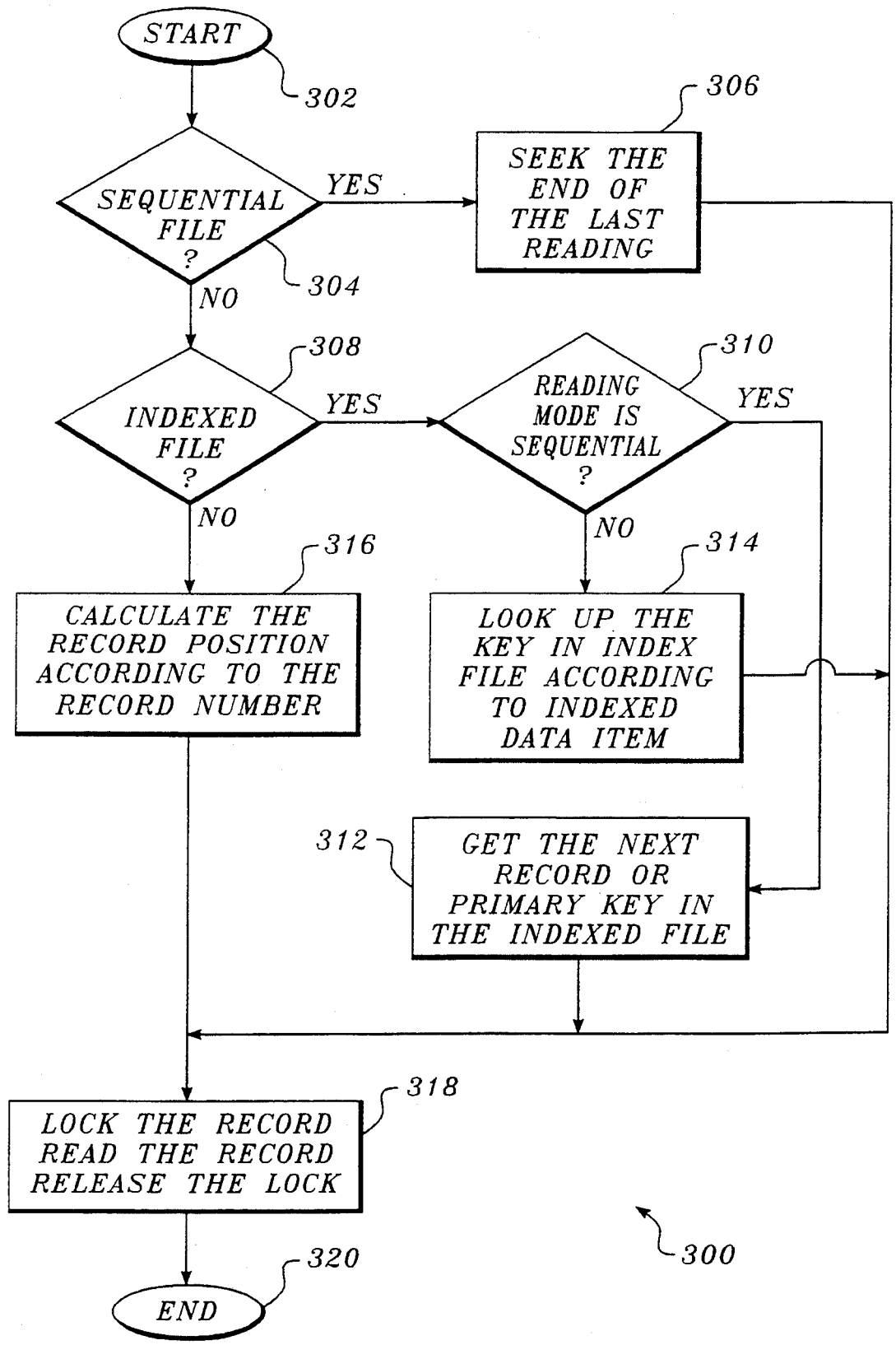
FIG. 13 is a flow chart disclosing the steps for reading an item.

Turning now to FIG. 13, a flow chart 300 illustrates the logic for reading from a COBOL data file. Beginning at a start block 302, a decision block 304 determines if the COBOL file is a sequential file type and if so, seeks the end of the data last read in a block 306. Thereafter, the logic proceeds to a block 318, wherein the item last read is locked, the item is read, and the lock is released. The logic then proceeds to an end block 320. Returning to decision block 304, if the file type is not a sequential, a decision block 308 determines if it is indexed and if so, proceeds to a decision block 310. In decision block 310, the logic determines if the reading mode is sequential and if so, proceeds to a block 312 to get the next item or the primary key in the indexed file. Following block 3 12, the logic again proceeds to block 318 to read the item.

If the reading mode is nonsequential in decision block 310, the logic proceeds to a block 314 to look up a key on the index file according to the indexed data item. Thereafter, the item is read in block 318 as described above. Assuming that in decision block 308 the file type is not indexed, the logic proceeds to a block 316, to determine the item position according to its number. Thereafter, the item is read in accordance with block 318.

Figure 14:
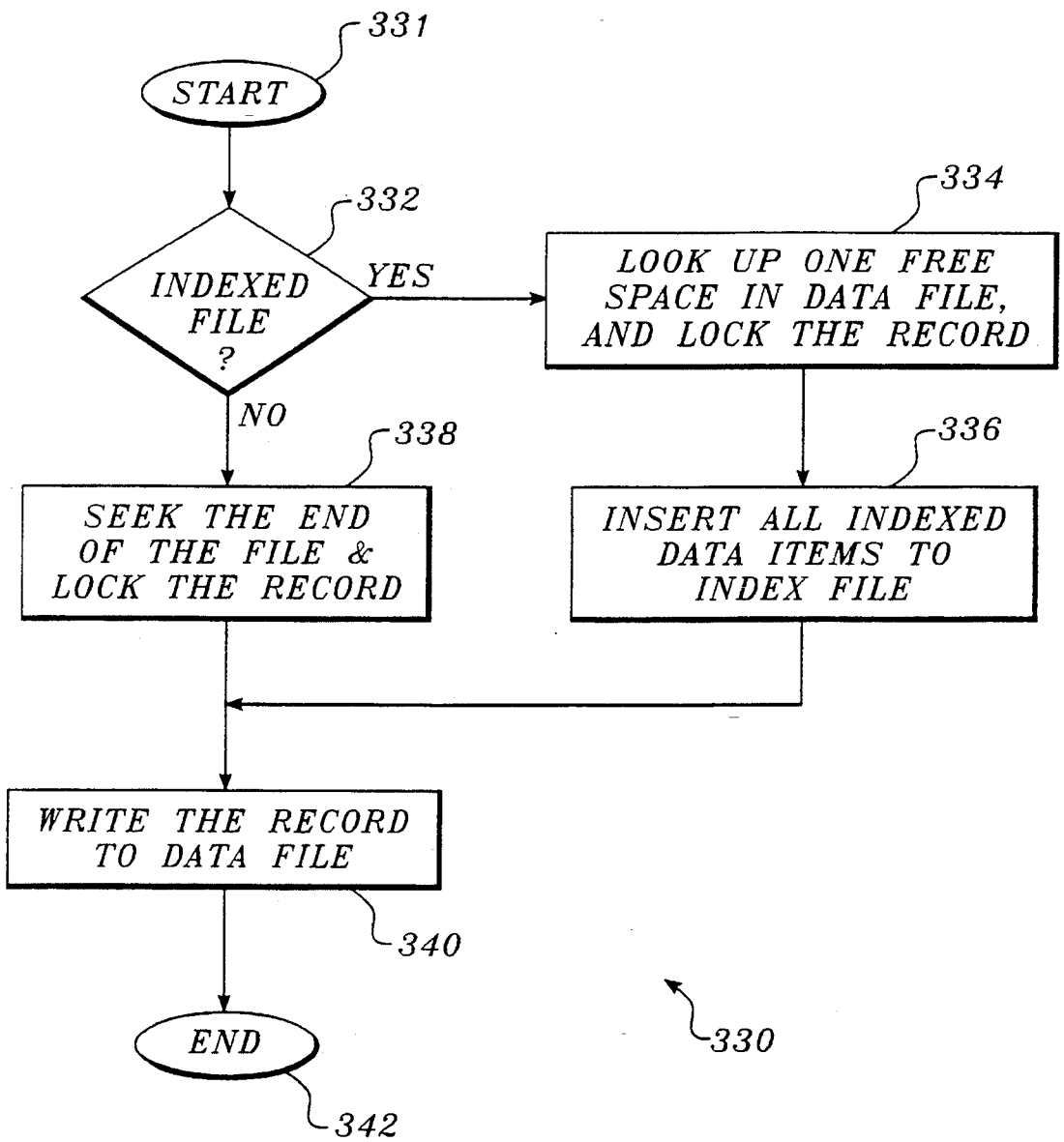
FIG. 14 is a flow chart that illustrates the logic employed for writing an item.

Turning now to FIG. 14, the logic for writing to a COBOL file begins with a start block 331. A decision block 332 determines if the file is indexed and if so, identifies free space in the data file and locks the item, in a block 334. Following that operation, a block 336 provides for inserting all indexing data items into the index file. Thereafter, the item is written to the data file in a block 340, leading to the conclusion of the process in end block 342. If, based upon decision block 332, the file is not indexed, a block 338 provides for seeking the end of the file and locking the item before writing the item to the data file in accordance with block 340.

The report subsystem is used for printing out the result of a query. It provides a set of commands to format query results into useful and meaningful reports. The report subsystem implements a number of CCSQL commands, which are generally similar to SQL commands. Specifically, the report commands can Set, Clear, and List a report environment data structure, such as column, break, computation, TTITLE, BTITLE, etc. After the environment data structures are set, they remain until Clear commands delete them. Among the report-related commands is the COLUMN command that redefines a column format, conversion, display name, etc., a column can have an alias name and the column definition can copy to a different column by name.

The BREAK command used in the report subsystem defines the break fields and the operations on those break points. It defines the number of lines to skip before or after breaking and the contents or value to be applied on a break line.

The COMPUTE command defines computations to be carried out on specified fields. Computations include options for: SUM, AVERAGE, NUMBER, COUNT, MAXIMUM, AND MINIMUM.

A TITLE command defines how the header and footer should look and is comprised of text, blanks, and values of certain fields. These values can also be formatted. If a field in the title does not appear in a Select list, the field name is not replaced by the value. Title items comprise: COLUMN, TAB, LEFT, CENTER, and RIGHT options that are used to determine the position of the title.

After all report environments are set, the report is output one item at a time. For each item, there can be values in the header or footer that need to be saved in a specific data structure for use by the header or footer generator. If there is a break field, it should be checked to determine if there is a break point. If so, the processing of the break field proceeds according to the break options and calculations that are set. The current item break fields' value for checking is then set for the next item. After all items are printed, a final break is processed to complete the output of the report.

While the preferred embodiment of the invention has been illustrated and described, it will be appreciated that various changes can be made therein without departing from the spirit and scope of the invention. Accordingly, it is not intended that the present invention be limited by the Disclosure set forth above. Instead, the scope of the invention should be determined entirely by reference to the claims that follow.

The embodiments of the invention in which an exclusive property or privilege is claimed are defined as follows:

1. A method for manipulating data stored in COBOL data files that are normally accessed using a COBOL procedural language, so as to allow direct access of the COBOL data files with a SQL, said method comprising the steps of:
   (a) creating dictionaries for each COBOL data file defined in related COBOL source programs, where, for each COBOL data file, a corresponding dictionary defines:
      (i) a $NF^2$ hierarchical logical relationship between levels of items comprising the data file; and
      (ii) attributes for each item;
   (b) parsing a request that is input by a user to determine an appropriate subsystem to implement the request and to determine what type of data manipulation is required;
   (c) implementing the request by initiating at least an appropriate one of a plurality of predefined data manipulation operations that act on data in the COBOL data file; and
   (d) providing a data output that is responsive to the request that was input by the user, said data output comprising a report that includes selected items of the data.

2. The method of claim 1, further comprising the step of creating a dictionary for any new COBOL data file that has been produced by:
   (a) scanning a COBOL source program associated with the new COBOL data file to determine the $NF^2$ hierarchical logical relationship between items comprising the new COBOL data file; and
   (b) assigning attributes to each of said items.

3. The method of claim 1, wherein the step of parsing to determine the appropriate subsystem includes selecting a subsystem from among a group of subsystems comprising:
   (a) a dictionary generator subsystem that defines the $NF^2$ hierarchical logical relationship and attributes for items in a COBOL data file;
   (b) a data manipulation language subsystem that implements operations to insert, delete, or update items of the database in accordance with the request input by the user;
   (c) a query process subsystem that derives a resultant table of data items by selecting specific fields from at least one of a COBOL data file in accordance with specified criteria that are provided in the request input by the user;
   (d) a file access subsystem that reads from and writes to COBOL data files; and
   (e) a report subsystem that produces the report in response to the request, said report including items selected by the query process subsystem.

4. The method of claim 1, wherein the step of implementing the request includes the step of carrying out at least one of the data manipulation operations, wherein said data manipulation operations are $NF^2$ relational algebra based and include:
   (a) forming a union of data items;
   (b) forming an intersection of data items;
   (c) determining a difference between data items;
   (d) determining a Cartesian product of data items;
   (e) determining a projection of data items;
   (f) performing a natural join of data items;
   (g) performing a nest of data items; and
   (h) performing an unnest of data items.

5. A method for manipulating data stored in a COBOL data file that are normally accessed using a COBOL procedural language, so as to allow access of the COBOL data file by a SQL, said method comprising the steps of:
   (a) generating a corresponding dictionary for the COBOL data file, said dictionary defining a $NF^2$ hierarchical logical relationship between levels of items comprising the COBOL data file;
   (b) parsing a request entered by a user, to identify any syntax error in the request;
   (c) creating an internal data structure to represent the request;
   (d) passing the internal data structure to a request processing kernel; and
   (e) manipulating the COBOL data file with the request processing kernel, in accordance with the internal data structure and based upon the corresponding dictionary, to implement the request.

6. The method of claim 5, wherein the request includes a COBOL program having at least one SQL statement embedded therein, said steps of parsing including the step of converting all SQL statement embedded in the COBOL program into a COBOL compatible structured language.

7. The method of claim 6, further comprising the step of using a corresponding dictionary to access data stored in any COBOL data file that is referenced in the COBOL compatible structured language.

8. The method of claim 5, wherein the step of parsing includes the step of transferring the request as one or more lines of text to a command stack, internally, as the request is input by the user.

9. The method of claim 5, wherein the step of manipulating data comprises at least one of the steps of:
   (a) creating a resultant table by selecting specific items from the COBOL data file satisfying criteria included in the internal data structure; and
   (b) modifying the COBOL data file by adding, changing, or deleting data.

10. The method of claim 5, wherein the step of manipulating data includes the step of generating a report that includes selected items of the COBOL data file, in accordance with the request of the user.

11. A system for manipulating data stored in a COBOL data file format that are normally accessed using a procedural language, so as to allow access of the data with a SQL employing a $NF^2$ data model, said system comprising:
   (a) a processor that carries out data manipulation in accordance with a set of machine instructions stored in a memory electrically coupled to the processor, said set of machine instructions comprising a data manipulation program, said data manipulation program causing the processor to selectively operate as:
      (i) dictionary generator means for defining a $NF^2$ hierarchical logical relationship for levels of items and attributes of each item of a COBOL data file;
      (ii) command interpreter means for parsing a request that is input by a user to determine an appropriate subsystem to implement the request and to determine a type of data manipulation that is required;
      (iii) kernel means for implementing the request that is input by initiating at least an appropriate one of a plurality of predefined data manipulation operations that act on the COBOL data file; and
      (iv) report means for producing a data output that is responsive to the request that was input by the user, said data output comprising a report that includes selected items from the COBOL data file;
   (b) a keyboard on which the user enters the request, said keyboard being electrically coupled to the central processing unit; and
   (c) means electrically coupled to the central processing means, for displaying the report to the user.

12. The system of claim 11, wherein the data manipulation program defines:
   (a) dictionary generator subsystem means for defining the $NF^2$ hierarchical logical relationship and attributes of each item in the COBOL data file;
   (b) data manipulation language subsystem means for implementing operations, including at least one of inserting, deleting, updating, selecting, and retrieving items of the COBOL data file in accordance with the request input by the user;
   (c) query process subsystem means for deriving a resultant table of data items by selecting specific items from at least one COBOL data file in accordance with specified criteria that are provided in the request input by the user;
   (d) file access subsystem means for reading from and writing to COBOL data files; and
   (e) report subsystem means for producing the report in response to the request, said report including data items selected by the query process subsystem means.

13. The system of claim 11, wherein the dictionary generator means include means for creating a dictionary corresponding to each COBOL data file by scanning a related COBOL source program.

14. The system of claim 11, wherein the data of the COBOL data file comprise at least one item, and wherein the kernel means comprise means for referencing each item in the COBOL data file.

15. A system for manipulating data stored in COBOL data files that are normally accessed using a COBOL procedural language, so as to allow access of the data by a SQL, comprising:
   (a) means for creating a corresponding dictionary for each COBOL data file by scanning related COBOL source programs, said dictionary defining for each COBOL data file:
      (i) a $NF^2$ hierarchical logical relationship between levels of items comprising the COBOL data file; and
      (ii) attributes for each item;
   (b) means for parsing a request entered by a user, to identify any syntax error in the request;
   (c) means for creating an internal data structure to represent the request;
   (d) means for passing the internal data structure to a request processing kernel; and
   (e) means for manipulating the COBOL data files with the request processing kernel, in accordance with the internal data structure and based upon the corresponding dictionaries, to implement the request.

16. The system of claim 15, wherein the request includes a COBOL program having at least one SQL statement embedded therein, further comprising means for converting all SQL statements embedded in the COBOL program into a COBOL compatible structured language.

17. The system of claim 16, wherein the means for converting use a corresponding dictionary to access data stored in any COBOL data file that is referenced in the COBOL compatible structured language.

18. The system of claim 15, wherein the means for parsing include means for transferring the request as at least one line of text, to an internal command stack, as the request in input by the user.

19. The system of claim 15, wherein the means for manipulating data include means for generating a report that includes selected data of at least one COBOL data file, in accordance with the request of the user.

* * * * *